(12) United States Patent
Wilson et al.

(10) Patent No.: US 7,027,540 B2
(45) Date of Patent: Apr. 11, 2006

(54) RECEIVER

(75) Inventors: John Nicholas Wilson, Hook (GB); Samuel Asangbeng Atungsiri, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 725 days.

(21) Appl. No.: 10/047,178

(22) Filed: Nov. 7, 2001

(65) Prior Publication Data

US 2002/0126220 A1    Sep. 12, 2002

(30) Foreign Application Priority Data

Nov. 9, 2000 (GB) .................................. 0027424

(51) Int. Cl.
*H04L 7/00*  (2006.01)

(52) U.S. Cl. ...................................... 375/354; 375/420
(58) Field of Classification Search ................ 375/354, 375/420
See application file for complete search history.

(56) References Cited

U.S. PATENT DOCUMENTS 6,507,585 B1 *  1/2003  Dobson ...................... 370/420
6,785,349 B1 *  8/2004  Rosenlof et al. ............ 375/343

FOREIGN PATENT DOCUMENTS

GB          2 211 053          6/1989

* cited by examiner

*Primary Examiner*—Stephen Chin
*Assistant Examiner*—Jaison Joseph
(74) *Attorney, Agent, or Firm*—Frommer Lawrence & Haug LLP; William S. Frommer; Thomas F. Presson

(57) ABSTRACT

A receiver is operable to detect a synchronisation position for recovering data from a set of received signal samples. The receiver comprises a filter having an impulse response matched to a predetermined characteristic of the received signal and is operable to produce an output signal which is representative of the convolution of the impulse response and the received signal samples. The receiver includes a synchronisation detector operable to detect the synchronisation position from the filter output signal, and a data detector operable to detect and recover data from the set of received signal samples from the synchronisation position provided by the synchronisation detector. The synchronisation detector is operable to represent each of the received signal samples as a positive or negative constant in dependence upon the relative sign of the signal sample, and to represent the samples of the filter impulse response as a positive or negative constant in dependence upon the relative sign of the impulse response samples, and the filter is operable to convolve the impulse response with the received signal samples by logically combining the representation of the received signal samples and the impulse response to produce the output signal. The receiver is therefore provided with a facility for detecting a synchronisation position from an output of the filter matched to a characteristic of the received signal.

The output signal of the matched filter is formed by logically combining the filter impulse response and the received signal samples to form a representation of a convolution but with a substantially reduced number of computations.

27 Claims, 7 Drawing Sheets

LIST OF SYMBOLS $T_u$    USEFUL SYMBOL DURATION IN SECONDS $T_g$    GUARD INTERVAL DURATION IN SECONDS $T_s$    TOTAL SYMBOL DURATION IN SECONDS $N_u$    NUMBER OF SAMPLES IN USEFUL PART OF SYMBOL $N_g$    NUMBER OF SAMPLES IN GUARD INTERVAL OF SYMBOL $N_s$    NUMBER OF SAMPLES IN WHOLE SYMBOL $N_{fs}$    NUMBER OF SYMBOLS AVERAGED FOR FINE SYMBOL ACQUISITION $N_t$    NUMBER OF SAMPLES AVERAGED FOR SYMBOL TRACKING

FIG. 7

RECEIVER

FIELD OF INVENTION

The present invention relates to receivers operable to detect and recover data from received signal samples. The present invention also relates to methods of detecting and recovering data from received signal samples.

Generally data is communicated using radio signals by modulating the data onto the radio signals in some way, and transmitting the radio signals to a receiver. At the receiver, the radio signals are detected and the data recovered from the received radio signals. Typically this is performed digitally, so that at the receiver, the detected radio signals are down converted to a base band representation and converted from analogue form to digital form. In the digital form the base band signals are processed to recover the data. However in order to recover the data, the receiver must be synchronised to the received digital signal samples to the effect that the relative temporal position of the recovered data symbols corresponds with the temporal position of the data when transmitted. This is particularly true for radio communications systems in which the data is transmitted as bursts or packets of data.

An example of a radio communications system in which data is communicated in bursts or blocks of data is the Digital Video Broadcasting (DVB) system. The DVB system utilises a modulation scheme known as Coded Orthogonal Frequency Division Multiplexing (COFDM) which can be generally described as providing K narrow band carriers (where K is an integer) and modulating the data in parallel, each carrier communicating a Quadrature Amplitude Modulated (QAM) symbol. Since the data is communicated in parallel on the carriers, the same symbol may be communicated on each carrier for an extended period. Generally, this period is arranged to be greater than a coherence time of the radio channel so that by averaging over the extended period, the data symbol modulated onto each carrier may be recovered in spite of time and frequency selective fading effects which typically occur on radio channels.

To facilitate detection and recovery of the data at the receiver, the QAM data symbols are modulated onto each of the parallel carriers contemporaneously, so that in combination the modulated carriers form a COFDM symbol. The COFDM symbol therefore comprises a plurality of carriers each of which has been modulated contemporaneously with different QAM data symbols.

In the time domain, each COFDM symbol is separated by a guard period which is formed by repeating data bearing samples of the COFDM symbol. Therefore, at a receiver, to detect and recover the data, the receiver should be synchronised to each COFDM symbol and the data demodulated from the data bearing signal samples of the COFDM symbol. A previously proposed technique for acquiring synchronisation with the data bearing signal samples of a COFDM symbol is to cross correlate two samples which are temporally separated by the period over which the data bearing samples are modulated. A relative temporal position of the two samples is then shifted within the COFDM symbol, until a position is found at which the cross-correlation produces maximum energy.

Although the previously proposed synchronisation technique works adequately in the presence of additive white gaussian noise, in some situations such as where the signal is received in the presence of multi-path propagation, this technique produces a sub-optimum synchronisation point, which can cause the data bearing signal samples to be corrupted with energy from adjacent signal samples. This is known as inter-symbol interference (ISI).

SUMMARY OF INVENTION

According to the present invention there is provided a receiver operable to detect a synchronisation position for recovering data from a set of received signal samples, the receiver comprising a filter having an impulse response matched to a predetermined characteristic of the received signal and operable to produce an output signal which is representative of the convolution of the impulse response and the received signal samples, a synchronisation detector operable to detect the synchronisation position from the filter output signal, and a data detector operable to detect and recover data from the set of received signal samples from the synchronisation position provided by the synchronisation detector, wherein the synchronisation detector is operable to represent each of the received signal samples as a positive or negative constant in dependence upon the relative sign of the signal samples and to represent the filter impulse response samples as a positive or negative constant in dependence upon the relative sign of the impulse response samples, and the filter is operable to convolve the impulse response with the received signal samples by logically combining the representation of the received signal samples and the impulse response to produce the output signal.

Generally, if a signal is transmitted with a known characteristic, such as for example, a known data sequence, or a guard period representative of data copied from another part of the signal, a likelihood of correctly detecting a synchronisation position from this known characteristic of the signal can be improved, if the receiver is provided with a filter matched to the received signal samples corresponding to this known characteristic data. This is generally implemented by providing a matched filter having a length corresponding to this characteristic data, and arranging for the receiver to excite the filter with the received signal samples, thereby producing an output signal from which the synchronisation position can be detected. However, generally the complexity of implementation and the computational task of performing the convolution for such a filter can be prohibitive, to perform and to implement, in terms of a number of gates and logical devices used in a semiconductor integrated circuit.

A receiver embodying the present invention is provided with an advantage because both the complexity of the computational task and the complexity of implementing the matched filter is reduced. This reduction is achieved in part by representing the value of the received signal samples and the matched impulse response as positive or negative constants and performing a logical combination of these constants to form a representation of the convolution of the received signal samples and the impulse response. This provides an output signal from which the synchronisation position can be detected.

Although the above explanation of the background of the invention has been made with reference to COFDM, it will be appreciated that the invention is not limited to any particular signal format and embodiments of the invention find application in detecting a synchronisation position from any received signal having a predetermined characteristic.

As will be explained in more detail shortly, a receiver embodying the present invention provides an improvement in detecting and recovering data from data bearing samples forming a set of received signal samples. The received signal samples have an example predetermined characteristic which is that the set includes guard signal samples temporally positioned either before or after the data bearing signal samples. In this example, the guard signal samples are formed by repeating the data bearing signal samples over a period which is equivalent to the guard interval. By providing the receiver with a filter having an impulse response matched to the signal samples of the guard interval an improved estimate of the sync position can be provided. As such the synchronisation detector may be operable to detect a synchronisation (sync) position in accordance with the distribution of energy with respect to time of the matched filter output response produced as the received signal passes through the filter. The peaks of the filter output signal generally correspond to replicas of the transmitted signal generated by propagation over the radio path. The receiver can therefore derive an improved estimate of the sync position by locating the earliest component of the radio channel and locating the window from which data can be recovered from the data bearing signal samples starting from this earliest significant component. This is particularly advantageous in the case of where the received signal is detected in the presence of multi-path propagation.

Although in some applications the received signal samples may be real only and the filter impulse response samples may be real only, generally, the received signal samples may be complex samples having real and imaginary components, and the filter may have a complex impulse response. Accordingly in preferred embodiments the synchronisation detector may be operable to represent the real and imaginary components of each of the received signal samples as a positive or negative constant in dependence upon the relative sign of the real and imaginary components, and to represent each of the real and imaginary components of the samples of the filter impulse response as a positive or negative constant in dependence upon the relative sign of the real and imaginary components, the filter being operable to combine logically the complex samples of the impulse response with the complex received signal samples.

As will be explained shortly, in preferred embodiments the logical combination of the positive or negative constants of the receive signal samples and the matched impulse response may be expressed as the following equation:

$$h_m(n) \cdot I = \sum_{i=0}^{N_g-1} 2 * \overline{XOR}(f_m(n-i) \cdot I, r(n-i) \cdot I) - 1$$

$$h_m(n) \cdot Q = \sum_{i=0}^{N_g-1} 2 * \overline{XOR}(f_m(n-i) \cdot Q, r(n-i) \cdot Q) - 1$$

where $\overline{XOR}(a,b)$ is the compliment of XOR(a, b), $h_m(n).I$ is the real part and $h_m(n).Q$ the imaginary part of the complex samples of said output signal.

A further reduction in the complexity of the implementation of the filter may be provided by selecting a predetermined number of samples of the impulse response of the filter, and performing the logical combining of the impulse response with the received signal samples only for the selected predetermined number of samples. Preferably in order to maintain the accuracy of the representation of the convolution, the selected predetermined number of samples of the filter impulse response may be evenly distributed over the temporal length of the impulse response. The predetermined number may be an integer fraction of the total number of samples of said impulse response.

Various further aspects and features of the present invention are defined in the appended claims.

BRIEF DESCRIPTION OF THE DRAWINGS

One embodiment of the present invention will now be described by way of example only with reference to the accompanying drawings wherein:

FIG. 7 is a table providing an indication of the meaning of symbols which are used throughout the description and drawings.

DESCRIPTION OF PREFERRED EMBODIMENTS

An example embodiment of the present invention will now be described with reference to detecting and recovering data from a COFDM symbol produced for example in accordance with the Digital Video Broadcasting (DVB) standard. The DVB standard is disclosed in a publication by the European telecommunications standards institute number EN300744 version 1.1.2 (1997–08) and entitled "Digital Video Broadcasting (DVB); Frame Structure Channel Coding And Modulation For Digital Terrestrial Television".

Figure 1:
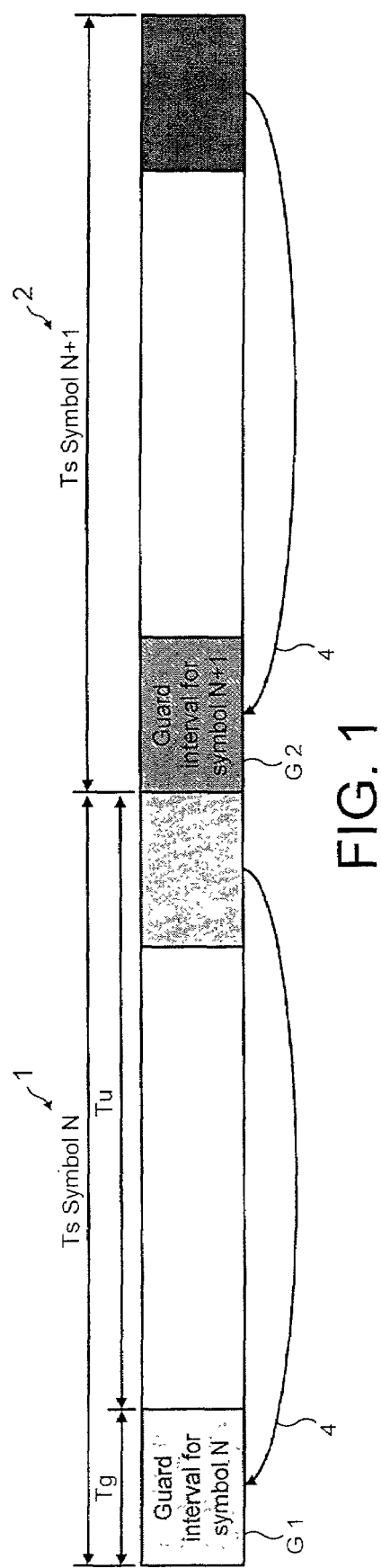
FIG. 1 is a schematic representation of two successive COFDM symbols.

As already explained, a COFDM symbol which is modulated in accordance with DVB standard is generated by modulating K narrow band carriers in parallel with the data to be communicated. Generally as disclosed in the above referenced ETSI publication, the COFDM symbols are formed in the frequency domain and then converted in the time domain using an Inverse Fourier Transform. A diagram representing the form of the COFDM symbols is shown in FIG. 1. In the following description, symbols which are used to represent various quantities are summarised in a table shown in FIG. 7.

In FIG. 1 two COFDM symbols represented as blocks 1, 2 are shown as they would be transmitted by a DVB transmitter with time progressing from left to right across the page. As shown in FIG. 1, each COFDM symbol 1, 2 has a useful part of the symbol during which the data is transmitted. This part of the symbol has duration of $T_u$ seconds and has $N_u$ samples. A guard interval G.1, G.2 of duration $T_g$ seconds separates the current symbol from the previous one. The guard interval has $N_g$ samples. For each symbol 1, 2 the guard interval G.1, G.2 therefore precedes the useful part of the symbol and is formed, as indicated by an arrow 4, by replicating the samples in the last $T_g$ seconds of the useful part of the symbol. Each COFDM symbol of $N_s$ samples therefore has duration $T_s=T_g+T_u$ seconds.

In order to recover the data within the COFDM symbols, the receiver must detect the data bearing signal samples from within the set of received signal samples corresponding to each COFDM symbol. Symbol acquisition entails the location of the optimum point at which the window for FFT processing should start. The FFT forms the core of the COFDM demodulator.

The replicated samples during the guard interval G.1, G.2 can be used to locate the start of each symbol at the receiver. This is what is referred to above as the location of the FFT window since the FFT must be performed over a segment of duration $T_u$ that preferably covers only the useful part of the symbol. However, FFT windows that start elsewhere within the guard interval can also be tolerated. Such FFT windows result in a phase slope at the output of the FFT that can be corrected if the FFT window location is to within $T_g$ seconds before the correct location. If however the window location error is excessive, the resultant phase slope wraps around $\pm\pi/2$ radians and so cannot be resolved and corrected. This results in inter-symbol interference (ISI) which degrades the receiver performance.

Figure 2:
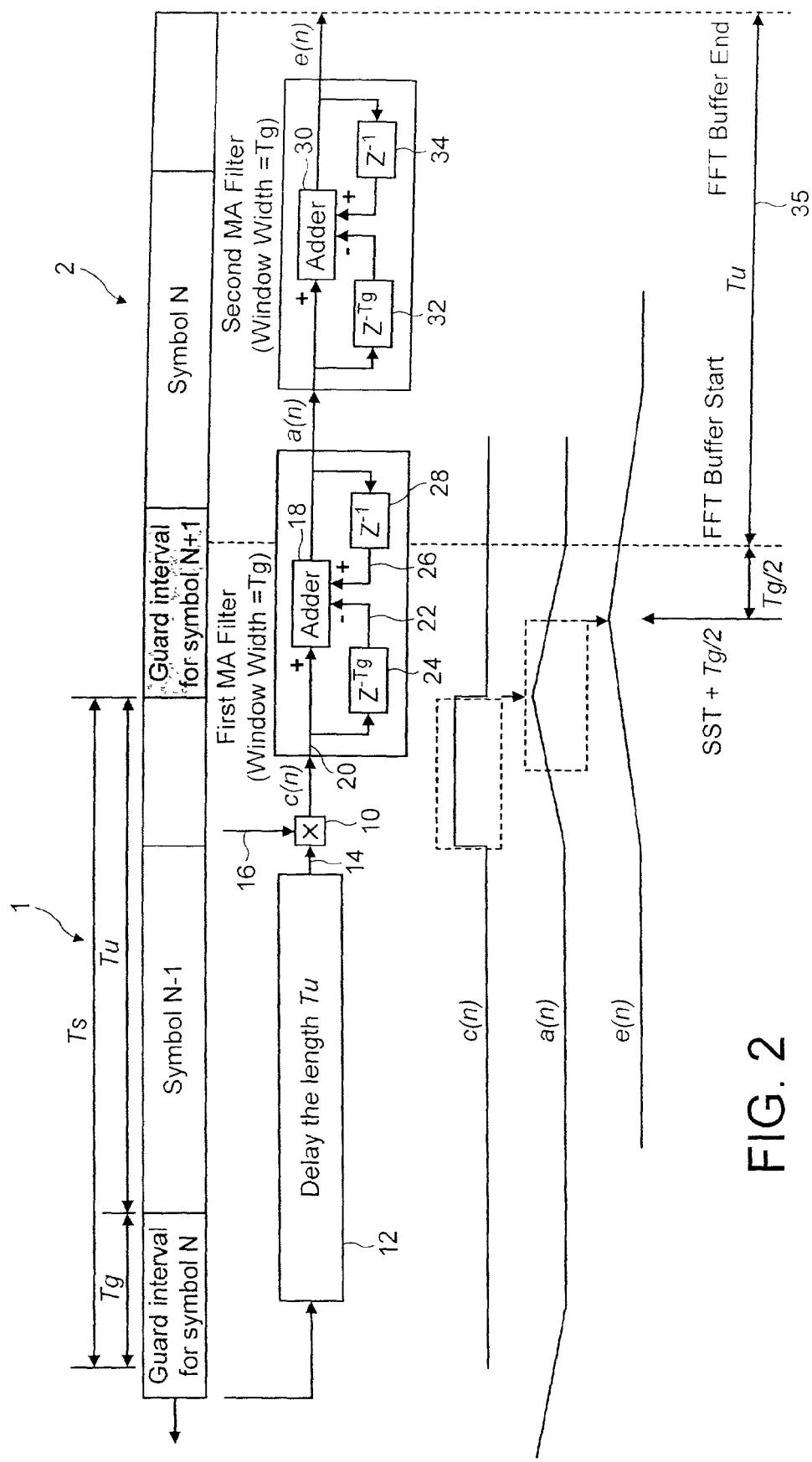
FIG. 2 is a schematic block diagram of a previously proposed synchronisation detector.

FIG. 2 provides an illustration of a previously proposed synchronisation detector for detecting the FFT window. Once the FFT window of the data bearing signal samples has been located, the data is recovered from these data bearing signal samples by applying an FFT. The FFT therefore converts the signal samples back into the frequency domain from which the data can be recovered from the K carriers. In FIG. 2 the two COFDM symbols 1, 2 are shown to be received by a correlator 10. A delay line 12 is arranged to delay the signal samples of the received symbols 1, 2 by an amount corresponding to the length of the signal samples $T_u$. The correlator 10 has a first input 14 which receives signal samples from the delay line 12 and a second input 16 which receives contemporaneously signal samples from the set of samples forming the received COFDM symbol. An output of the correlator c(n) is then fed to an adder 18 on a first input 20. The adder 18 is arranged to receive the output from the correlator 10 on a second input 22 delayed by a delay 24 by a period equal to that of the guard interval. The adder 18 also receives on a third input 26 samples from the output of the adder 18 a(n) fed back via a one sample delay 28. The output from the adder a(n) is then received on a first input of a second adder 30 which also has second and third inputs. The second input receives a version of the output from the first adder a(n) via a delay producing a delay equal to the guard interval 32 and the third input of the second adder 30 receives samples fed back from the output of the second adder via a further one sample delay 34. The output of the second adder e(n) provides a signal from which the FFT window for recovering the data from the COFDM symbols can be determined.

The first adder 18 in combination with the delays 24, 28 effectively form a moving averaging window filter having a length equal to the period of the guard interval. The second adder 30 and the delays 32, 34 form a second moving averaging filter having a window equal to the period of the guard interval. The outputs of the correlator, the first adder and second adder are also shown in FIG. 2 plotted with a respect to time in relationship with the time axis of the COFDM symbols 1, 2. As shown the output of the correlator c(n) produces a square pulse which corresponds effectively with the auto-correlation of the guard interval. This is of course in the absence of noise. The output of the first adder a(n) produces an integration of the output of the correlator c(n) and the output e(n) of the second adder 30 produces a further integration of the output of the first moving averaging window. For each symbol, the samples in the guard interval also occur in the last $T_g$ seconds of the symbol. The moving window also has duration of $T_g$ seconds. Equation (1) illustrates the computation of the correlation for each received sample r(n)=r(nT) where T is the sample time of the received sequence at the receiver:

$$c(n) = r(n)r*(n - N_u) \quad (1)$$

$$a(n) = \sum_{k=0}^{N_g-1} c(n-k)$$

for n=0,1, ... $N_s$-1 where r*(n) is the complex conjugate of r(n).

The value of n which produces the maximum of a(n) within a given sequence of $N_s$ received samples therefore provides the optimum coarse sync position. The moving correlation sequence a(n) can be averaged with similar sequences computed over a number of successive $N_s$ length windows in order to improve acquisition performance during low signal to noise ratio (SNR). Furthermore, the correlation sequence a(n) can be also integrated over a window of $T_g$ seconds in order to enhance performance in dispersive or multi-path channels. This integration which can be done prior to the averaging over successive $T_s$ seconds windows is described by the equation (2).

$$e(n) = \sum_{k=0}^{N_g-1} a(n-k) \quad (2)$$

Effectively then a peak of the second moving averaging window provides an indication of the start of the data bearing signal samples. The FFT window 35 of duration $T_u$ corresponding to the period of the data bearing signal samples is therefore determined.

Figure 3:
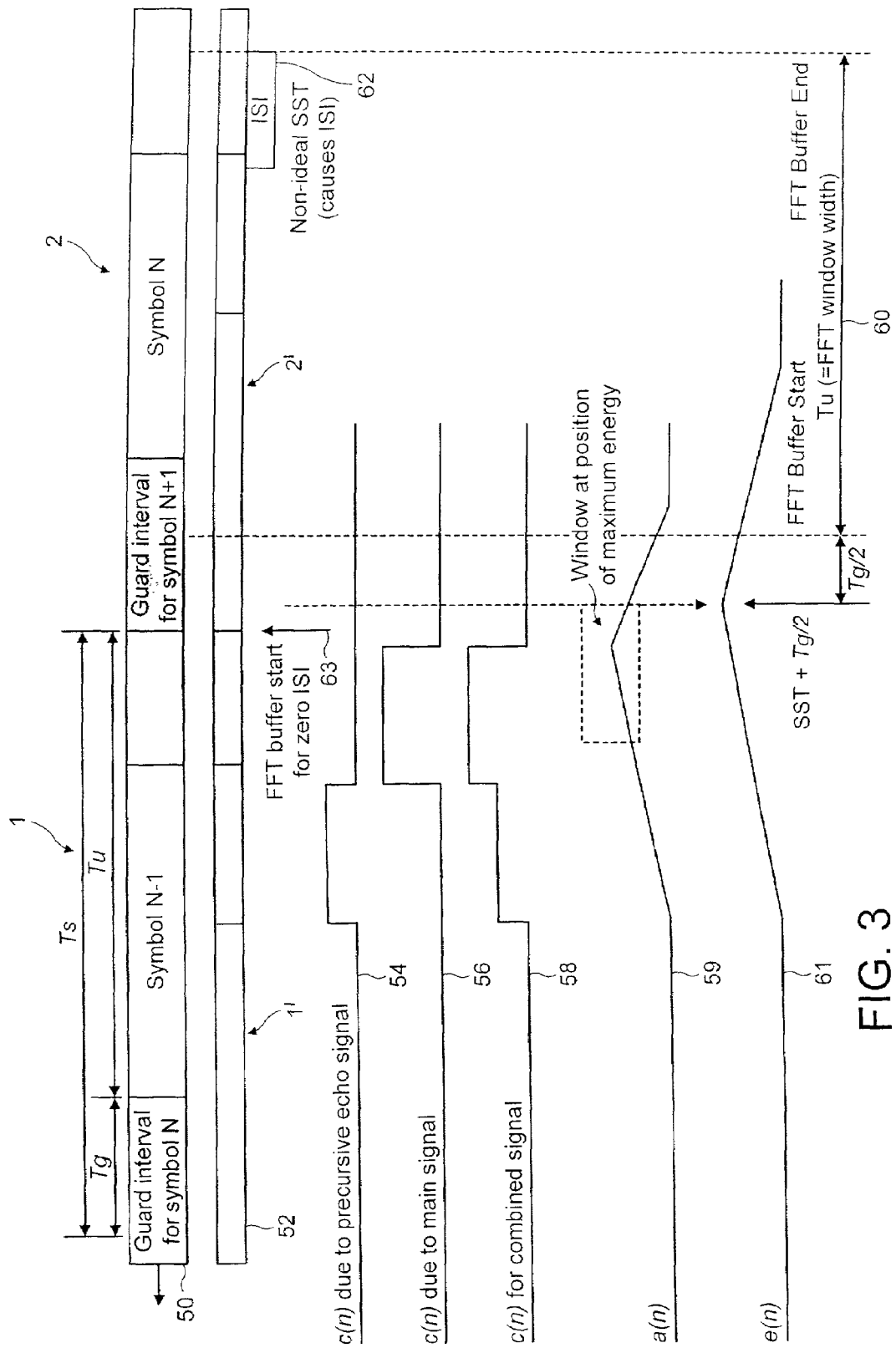
FIG. 3 is a schematic representation of the two COFDM symbols of FIG. 1 being received at a receiver via a main path and an echo path.

Although the synchronisation detector shown in FIG. 2 can provide an indication for the FFT window for recovering the data from the COFDM symbol, in some situations for example where the received signal is detected in the presence of multi-path propagation, the sync position from which the FFT window is positioned can be offset if the received signal is detected in the presence of multi-path, which can cause inter-symbol interference between COFDM symbols to the effect that the FFT window includes energy from the guard signal samples from the next COFDM symbol. This causes errors in the detected data. In FIG. 3 the COFDM symbols 1, 2 are shown with a second version of the COFDM symbols $1^1$, $2^1$ which provide a schematic illustration of multi-path propagation via a first main path 50 and a second echo path 52. A representation of the output of the correlator 10 c(n) due to the echo path 52 and the main path 50 are represented graphically in FIG. 3 by the lines 54 for the echo signal and for the main signal 56. As detected at the receiver, the correlator output signal will be effectively a combination of the contributions from the main signal 50 and the echo signal 52. The output of the correlator as experienced in the presence of multi path comprising a main and an echo component is represented graphically by a third line 58 which effectively forms the combination of the correlator for the main and echo paths. A result of the first and second moving averaging filters is represented graphically on the fourth and fifth plots 59, 61 of amplitude with respective time for the output of the first adder 18 a(n) and the second adder 30 e(n).

As illustrated by the fourth and fifth graphical representations a result of the pre-cursor echo path 52 is to shift the synchronisation point detected by the correlator so that the FFT window is now biased to a point later in time then the ideal position which is illustrated in FIG. 3 by an arrow 63. In the presence of a low power pre-cursive echo, the window location will be skewed towards the higher energy echo that occurs later. As the separation between the echoes increases, it becomes more likely that the window location derived from the above algorithm will fall outside the guard interval of the low power path and so result in failure to correctly equalise the low power echo. When this happens, the low power echo becomes the source of ISI thereby degrading the performance of the demodulator.

As shown in FIG. 3 a window 60 which defines the signal samples from which data is recovered, now includes signal samples which are influenced by the guard interval for an un-related COFDM symbol for the pre-cursive echo path. As a result the samples from within a region 62 will be affected with inter-symbol interference and therefore will be more likely to cause errors in all carriers after the FFT when the data is recovered from the carriers in the frequency domain.

Figure 4:
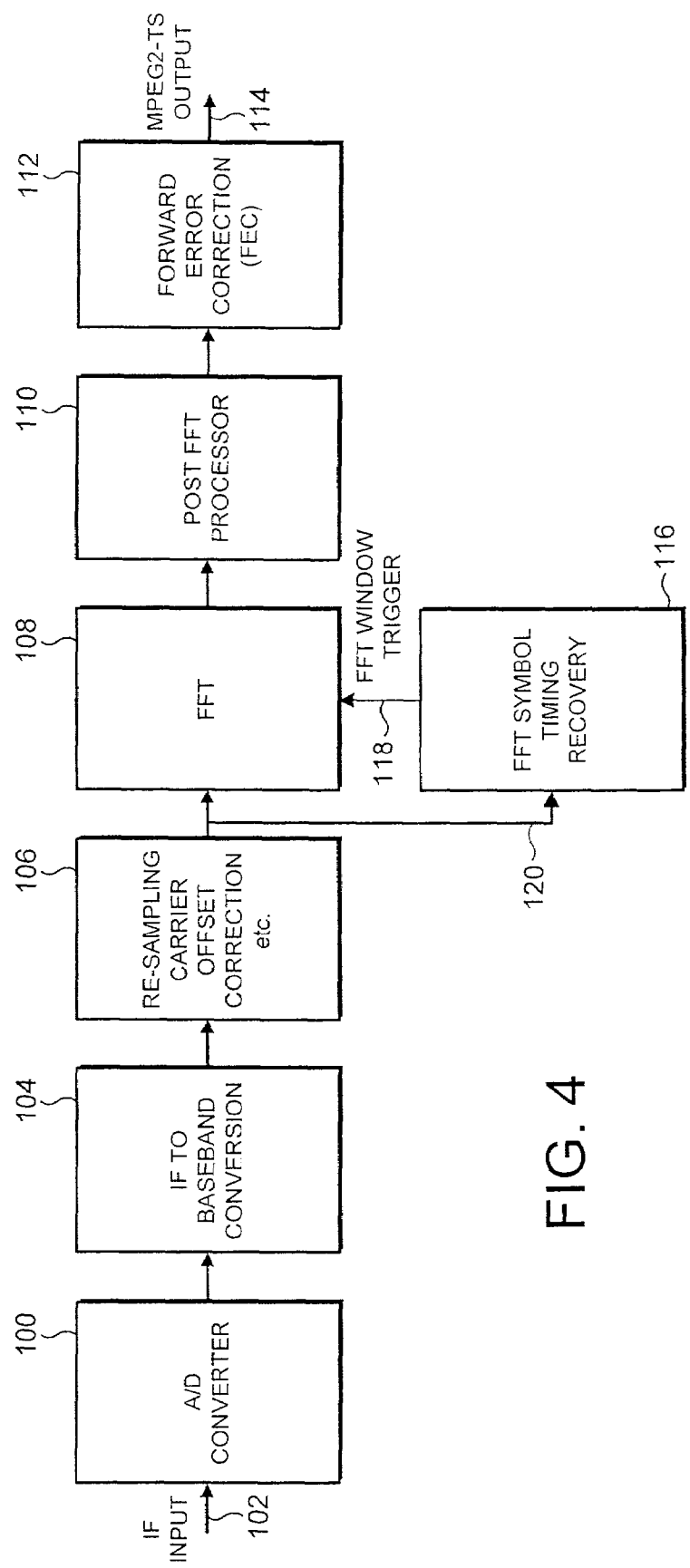
FIG. 4 is a schematic block diagram of a receiver according to an embodiment of the present invention.

A receiver for detecting and recovering data from for example a COFDM symbol is shown in FIG. 4. The receiver shown in FIG. 4 is operable to correlate the guard signal samples with the set of received signal samples which provides a representation of the multi-path components, thereby allowing the FFT window positioning decision to be taken on the basis of the time occurrence of significant echoes rather than merely the energy of these echoes. In implementation, a compact architecture is also proposed which results in a lower gate count and improved speed. Furthermore, the synchronisation detector is also used for tracking and time adjustment of the FFT window position as echoes are born, change in energy and/or finally disappear.

In FIG. 4 an analogue to digital converter 100 is arranged to receive an intermediate frequency (IF) signal representative of the detected radio signal the COFDM symbol has been modulated. The receiver also includes down conversion means and detection means in order to convert the radio frequency signal into an intermediate frequency signal which is fed to the analogue to digital converter 100 via an input 102. Thus it will be appreciated that the receiver may also include radio frequency receiving and down converting means which are not shown in FIG. 4. After being analogue to digitally converted the received signal is processed by an intermediate frequency to base band version means 104 before being processed by a re-sampling and carrier offset correction processor 106. The re-sampling and carrier offset correction processor is arranged to track in the frequency domain the K carriers of the COFDM modulation. The base band received signal samples are then fed to a Fast Fourier transform processor 108 which serves to convert the time domain received signal samples into the frequency domain. The data is then recovered from the frequency domain signal samples by a post FFT processor 110. The data is then fed to a forward error correction processor 112 which operates to decode the error correction encoded data to finally produce the recovered data at an output 114.

The receiver according to this example embodiment provides a synchronisation detector which locates the FFT window from which the data bearing signal samples are processed by the FFT processor 108. The FFT window position is adjusted in order that the window includes the maximum energy representative of the data bearing signal samples. To this end an FFT symbol timing recovery processor 116 is arranged to generate a signal indicative of a sync position which is fed to the FFT processor 108 via a connecting channel 118. The FFT symbol timing recovery processor 116 is arranged to detect the sync position from the received set of signal samples which represent each COFDM symbol. These are received from the re-sampling and carrier offset correction processor 106 via a connecting channel 120. The operation of the FFT symbol timing recovery processor 116 will now be described with reference to FIG. 5 where parts also appearing in FIG. 4 bear the same numerical designations.

Figure 5:
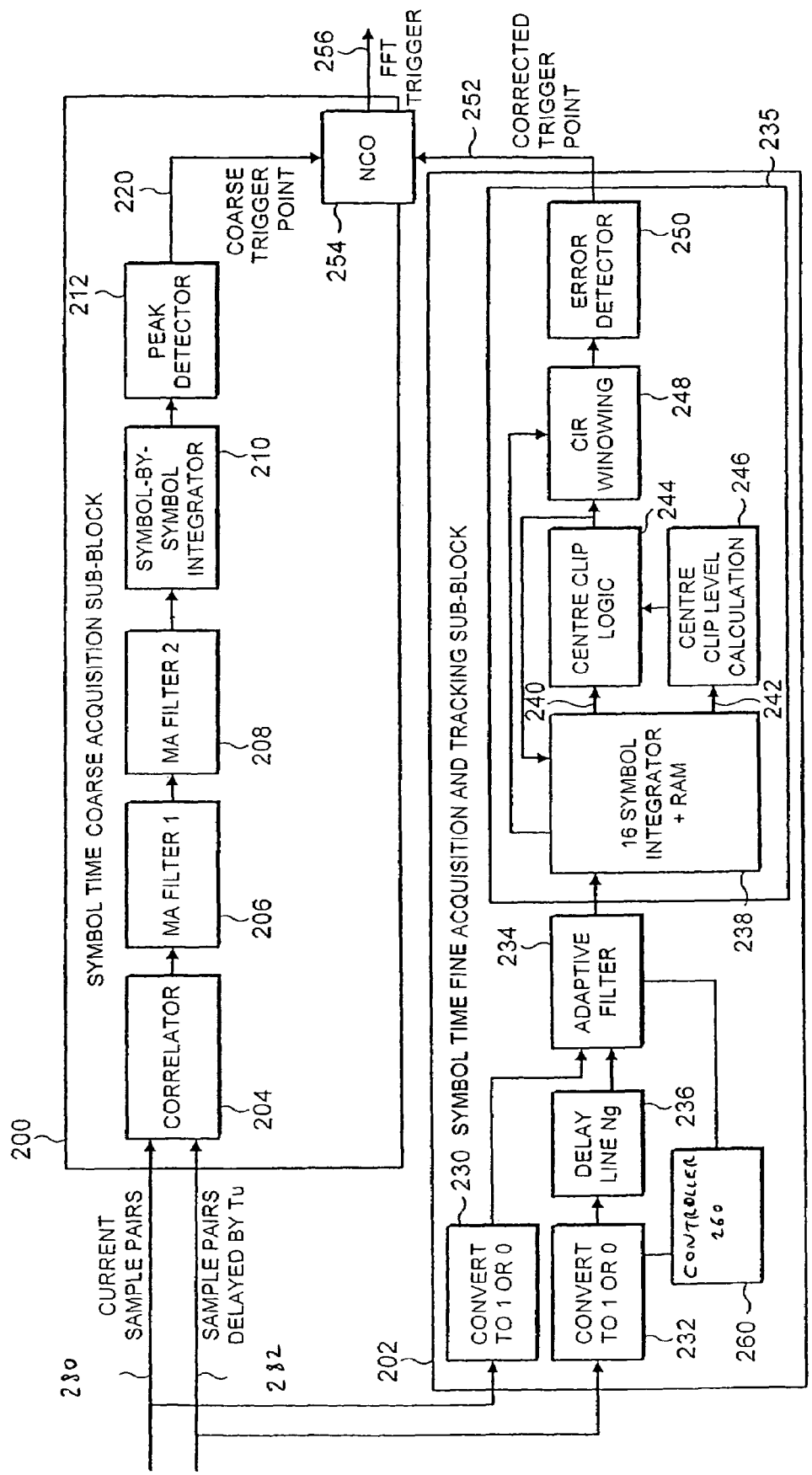
FIG. 5 is a schematic block diagram of a synchronisation detector forming part of the receiver shown in FIG. 4.

The symbol time recovery processor shown in FIG. 5 is comprised generally of a coarse acquisition processor 200 and a fine acquisition processor 202. The coarse acquisition processor operates generally in accordance with the previously proposed synchronisation detector shown in FIG. 2.

Coarse Synchronisation Detector

As shown in FIG. 5 the coarse acquisition processor comprises a correlator 204 which is arranged to receive the set of received signal samples corresponding to the COFDM symbol via a first input 280. The set of received signal samples are also received via a second input 282 but delayed by a period $T_u$ corresponding to the temporal length of the data bearing signal samples of the COFDM symbol. The correlator 204 is arranged to cross correlate the two signal samples from the received signal as previously explained with reference to the previously proposed detector in FIG. 2. The correlator then feeds the result of the correlation to a first moving averaging filter 206 which integrates the output of the correlation. This is in turn fed to a second moving averaging filter 208 which integrates the output of the first moving averaging filter. The output of the second moving averaging filter 208 is then integrated on a symbol by symbol basis by an integration processor 210. The integration processor 210 serves to integrate the output signal from the second moving averaging filter 208 over successive COFDM symbols so that a combined output is produced for these successive symbols. The output of the integrator 210 is then fed to a peak detector 212. The peak detector 212 is arranged to generate a peak value of the symbol integrator. However unlike the previously proposed arrangement shown in FIG. 2, the length of the integration over e(n) is reduced to only $N_g/4$ to make the energy peak even more biased toward the highest echo as the fine synchronisation detector depends on accurate location of the dominant path. A peak detector 212 then determines the relative displacement which corresponds to the peak of the integrated output signal from the integrator 210 therefore providing a coarse trigger point to the fine synchronisation detector 202.

Fine Synchronisation Detector

The fine synchronisation detector provides an improved estimated of the sync position by utilising a transversal filter which is adaptively matched to the guard interval of successive COFDM symbols. An end of symbol marker is obtained for the dominant multi-path component from the coarse synchronisation detector. This is used to locate the start of the guard interval on each symbol. For symbol m, the received signal either side and including its guard interval, which comprises $3N_g$ of samples, are used to set the taps $f_m(i)$ of the transversal filter. In effect, therefore the received signal is correlated with respect to $3N_g$ worth of samples. This therefore allows for some error in the coarse estimated location of the guard signal samples. Once the filter taps have been set the block $r_m(n)$ of the last $N_g$ samples of the symbol, which were copied to form the guard interval are filtered by the matched filter to produce an output signal. As the filter is excited with these samples, a pulse train $h_m(n)$ representing an approximation to the channel impulse response (CIR) during symbol m is produced at the output since the filter is nominally matched to its excitation. This is represented in equation (3).

$$h_m(n) = \sum_{i=0}^{N_g-1} f_m(n-i)r(n-i) \qquad (3)$$

The fine synchronisation detector 202 is also arranged to receive the set of received signal samples and the delayed set of received signal samples from the first and second inputs 280, 282. The received signal samples from the first and second inputs 280, 282 are fed respectively to the first and second binary converters 230, 232. The output from the binary converter is fed to a first input of an adaptive matched filter 234. A second input to the adaptive matched filter is fed with samples from the output of the binary converter 232 via a delay line 236 which serves to delay each sample by a period corresponding to the number of samples within the guard period. The output of the adaptive matched filter 234 is received at an integrator 238 forming part of a synchronisation detection processor 235. The integrator 238 serves to integrate the output of the matched filter, the integrated output being presented on first and second outputs 240, 242 to a centre clip processor 244 and a centre clip level calculator 246. As will be explained shortly, the centre clip processor and the centre clip level calculator 244, 246 are arranged to pre-process the output of the adaptive matched filter which has been integrated by the integration processor 238 to the effect of cancelling various peaks of the adaptive filter output which could otherwise give a false indication of the synchronisation point. As such the performance of the synchronisation detector is improved particularly in the presence of noise.

The pre-processed output from the centre clip processor is then fed to a channel impulse response windowing processor 248. The windowing processor 248 provides a further pre-processing operation to the effect of isolating an analysis window within which the pre-processed output of the adaptive filter produces the maximum energy. It is within this analysis window that a peak output of the adaptive matched filter is determined by an error detection processor 250 with respect to the coarse synchronisation estimate provided by the coarse synchronisation detector 200. The operation of the fine synchronisation detector is controlled by a controller 260.

The error detector 250 produces a corrected synchronisation position at an output 252 which is combined with the coarse synchronisation estimate provided at an output 220 by a combiner 254 to produce the start point of the FFT window generated at an output 256. The operation of the fine synchronisation detector and in particular the operation of the adaptive filter 234 will now be described with reference to FIG. 6 where parts also appearing in FIG. 5 have the same numerical references.

Figure 6:
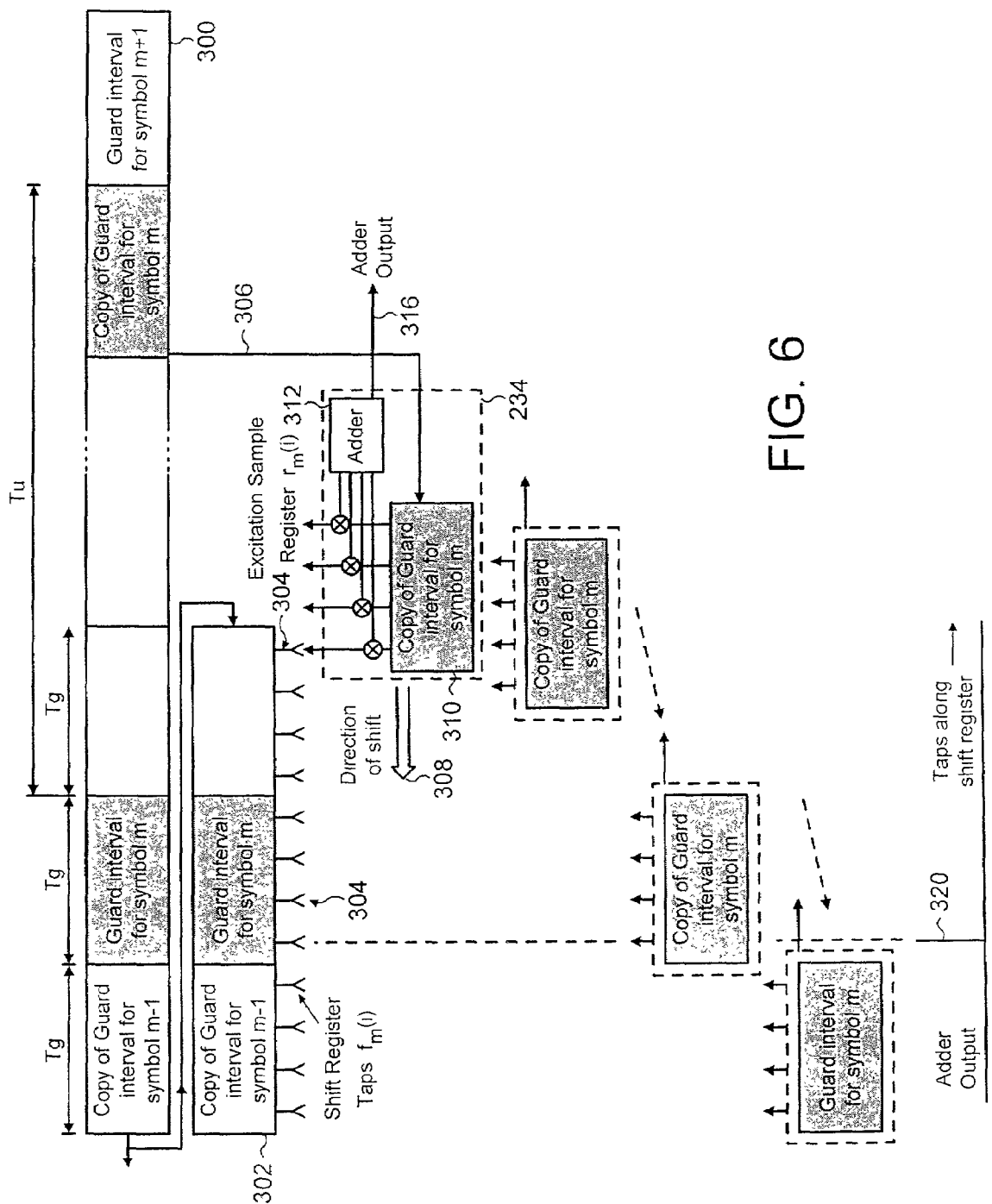
FIG. 6 is a schematic representation illustrating the processing of OFDM symbols by a matched filter forming part of the receiver of FIG. 5.

In FIG. 6 a representation of each of the guard signal samples for successive COFDM signals is represented graphically by sections 300 which are arranged to feed a shift register 302. The taps 304 of the shift register are arranged to provide the samples from the guard period. For each successive COFDM symbol, the shift register taps 304 are arranged to represent three guard signal samples worth $3N_g$ of the received signal samples around, and including the guard signal samples for the particular COFDM symbol. As such, the controller 260 within the fine synchronisation detector is arranged in operation to adapt the taps of the matched filter 234 to correspond to the $3N_g$ signal samples of the guard period and surrounding samples for each of the successive COFDM symbol. Therefore, as shown in FIG. 6 for the m-th symbol, the matched filter is adapted to have the $3N_g$ signal samples around and including the m-th guard interval. As illustrated by an arrow 306 shown in FIG. 6, the received signal samples from which the guard signals samples were formed are fed into and excite the adapted matched filter 234. As a result of the excitation of the matched filter by the received signal sample copied to form the guard signal samples which is indicated by the direction of shift with respect to time 308, an output of the adder 310 when the position of the copy received signal samples coincides with the guard samples is to produce a peak output 320 at the output of the adder 316. As each successive symbol is received, the filter is adapted by replacing its taps with the samples around the guard interval and then waiting for the arrival of the excitation samples. The output of the filter for each symbol is an array of $2N_g+1$ complex numbers. The output arrays from $N_{fs}$ successive symbols as shown in equation (4) are averaged together to filter out noise from the CIR. Then, by computing the absolute value for each averaged impulse, the magnitude of the CIR is derived. As such the output of the matched filter generates effectively the convolution of the guard signal samples with itself which produces effectively a representation of the channel impulse response. By analysing the peaks from the output of the matched filter, an improved synchronisation position can be formed by detecting the earliest of the peaks in order to mitigate the ISI. From this sync position the FFT window can be positioned and from this the data recovered from the COFDM symbol.

$$h(n) = \left| \sum_{m=0}^{N_{fs}} h_m(n) \right| \qquad (4)$$

As already explained, coarse acquisition only gives the dominant multi-path component. Components located within $\pm T_g$ seconds of this dominant component can be equalised. Therefore, the transversal filter has to have a length of at least $3N_g$ to cover both pre-cursive and post-cursive components.

As already explained, the synchronisation detector 250 detects the sync position for the start of the FFT window, from the output of the matched filter. However, in order to improve the probability of correctly detecting the optimal sync position, the fine synchronisation detector 202 is arranged to pre-process the output signal from the matched filter before the sync position is detected from the pre-processed output signal. The pre-processing is performed by the integrator 238, the centre clip processor 244, the centre clip level calculator 246, and the CIR windowing processor 248. The pre-processing operations performed by each of these processors will now be explained in the following paragraphs.

Noise Elimination from Magnitude CIR

The signal-to-noise ratio of the output of the matched filter h(n) can be improved by increasing the number of symbols $N_{fs}$ over which the output of the adaptive matched filter is averaged. The averaging is performed by the integrator 238. This is represented by equation (4). However, a large value for $N_{fs}$ also implies longer acquisition times (during acquisition) and longer update times (during tracking). The choice of $N_{fs}$ is therefore of necessity, a compromise. This means that the magnitude CIR h(n) is often quite noisy. The noise is reduced by the centre clip processor 244.

The output signal would generally comprise a plurality of temporally separated peaks from which the synchronisation position is detected. However in order to provide an improved estimate of the sync position particularly for example in the presence of noise, the synchronisation detector may be processed with a centre clip processor 244 operable to pre-process the output signal by identifying the temporal position of the peaks within the output signal which have an amplitude which is less than a predetermined threshold and setting the value of the output signal to a predetermined default value at the identified temporal positions. Therefore, effectively any peak having a value which is less than a predetermined threshold is set to a predetermined value, such as zero so that particularly in the presence of noise the sync position can be detected from amongst the largest peak.

Ghost Echo Elimination

The output of the matched filter exhibits some peaks which do not represent real echoes, that is to say, echoes produced by propagation paths of the radio channel. This is because the matched filter impulse response and its excitation have both travelled through the same channel and so have each been convolved with the channel impulse response. During the matched filtering process, these channel impulse response components autocorrelate and produce unwanted peaks at the output of the filter. These unwanted peaks are referred to as ghost echoes. Preferably, the ghost echoes should be identified and cancelled in order to improve the likelihood of correctly detecting the optimum synchronisation position. The centre clip processor 244 is also arranged to cancel ghost echoes from the output signal. A further improvement is provided in the detection of the sync position by pre-processing the output signal by locating the relative temporal position of the maximum peak within the output signal, identifying for each other peak sample of the output signal another sample of the output signal at an opposite corresponding temporal displacement with respect to the relative temporal position of the maximum peak, comparing these two samples and replacing the lower of the two samples with zero.

Embodiments of the present invention can therefore at least in part cancel echoes so that the peak value corresponding to the sync position can be more effectively identified from only the peaks of the output signal which correspond to the actual channel impulse response. This is done using the centre-clipper processor 244 in combination with the centre clip level calculator 246. Significant echoes in h(n) are determined by comparing their magnitude to a pre-determined threshold, the level of which is based on the minimum level of power an un-equalised component or echo needs to have to cause noticeable degradation on the performance of the demodulator. Only echoes that lie above this threshold are retained. All other samples of h(n) are set to a default value such as zero.

Pulses indicating real echoes are often higher in amplitude than their corresponding ghosts. For any real echo located N samples before the main path, a ghost is located N samples after the main echo in the output signal and vice versa. To eliminate ghost echoes, the centre clip processor 244 of the synchronisation detector 235 tests the output signal at equal distances on either side of the main path, retaining the higher amplitude impulse and setting the lower to zero.

Determination of the Channel Impulse Response Length

At the receiver, the maximum length of the channel impulse response of the radio channel which can be resolved corresponds to the guard period. However, the magnitude of the output of the matched filter h(n) according to equation (3) will be of length $2N_g+1$ samples. From this only an analysis period of length $N_g+1$ that forms the actual channel impulse response is relevant to finding the sync position. This means that only echoes which lie within one guard interval need to be processed. Therefore in order to further improve the estimate of the sync position, in preferred embodiments the synchronisation detector 235 may be provided with a CIR processor 248 operable to pre-process the output signal by generating a representation of the amount of energy of the output signal within a period corresponding to the temporal length of the guard signal samples, for each of a plurality of relative displacements of the guard period with respect to the output signal. The relative displacement of the period having the most energy is then determined, this corresponding to the start of a window of the output signal which contains a representation of the channel impulse response.

In operation, the channel impulse response processor 248 passes the output h(n) of the matched filter through a moving average filter of order $N_g+1$ to produce an output signal y(n) corresponding to the energy in the signal at the respective displacements according to equation (5):

$$y(n) = \left| \sum_{i=0}^{N_g} h(n+i) \right| \text{ for } n = 0, 1, \ldots N_g. \quad (5)$$

where h(n) is the output of the matched filter.

The index $I_y$ for which y(n) is maximum is therefore the start of the window which contains the representation of the impulse response of the channel, the start of the window corresponding to the optimum sync position being sought Advantageously, the CIR processor 248 may have a second moving average filter, the controller 260 being operable to also excite this second moving average filter with the output samples of the matched filter but in reverse order. The moving average filter is operable to produce a second output signal which is representative of the energy in the reversed matched filter output.

The output of the second moving average filter can be expressed by equation (6), where z(n) is the output of the second moving average filter. As in the first moving average filter, the index $I_z$ for which z(n) is maximum is also identified. The length of the channel impulse response can then be computed as the difference $(I_z+N_g-I_y)$ between the two indices from equations (5) and (6).

$$z(n-N_g) = \left| \sum_{i=0}^{N_g} h(n-i) \right| \text{ for } n = 2N_g, 2N_g-1, \ldots, N_g \quad (6)$$

Therefore a further improvement in the probability of correctly recovering the data is provided because the channel impulse response can be more accurately determined within the analysis window set between the start and end positions determined as a result of this pre-processing.

Tracking

During normal operation, new multi-path components might emerge whilst existing ones might change in amplitude. This happens because of movement of objects around the transmitter and/or receiver or across the propagation path etc. In such operation a pre-cursive channel profile might change into a post-cursive profile and vice versa. To maintain performance, in preferred embodiments, the controller 260 the FFT window location is arranged to track these changes in the channel profile. The techniques described above are also used to track changes in channel profile. The location of the dominant multi-path component nominally coincides with the middle tap of the transversal filter. Since the filter has a length of $3N_g$ samples, we can see multi-path components that are located within one guard interval can be identified either side of the dominant path.

The last output sample of the transversal filter occurs nominally at $2N_g$ samples after the start of the dominant path symbol. From the centre of the filter multi-path components can be identified to within $\pm N_g$. Therefore the location of the FFT window can be advanced or retarded by adjusting the FFT window point for the earliest echo. In tracking mode, the complex output from the matched filter is averaged over $N_t$ symbols so as to filter out any noise in the estimates. The ideal FFT window start location is then calculated at $T_g$ seconds later than the start of the optimum CIR. This is compared with the current FFT window start position and adjusted accordingly if the two are different.

Implementation of the Matched Filter

In order to filter the received signal samples with an impulse response corresponding to the guard signal samples, the filter must perform a convolution of complex signal samples of the COFDM symbol. In 2K mode and ¼ guard for example, the filter therefore has at least 3*512=1536 taps. Similarly, in 8K mode and ¼ guard, the filter has 3*2048=6144 taps. Since each tap is complex and the excitation samples are also complex, such filters could be prohibitively costly in gates and/or processing delay to implement. Preferably, a compact architecture with manageable gate count and/or processing delay should be used. For reasonable performance in the presence of interference most COFDM demodulators adopt at least 10 bits per quadrature sample. This means that for the filter described above, each tap would be represented with two 10-bit numbers for the real and imaginary parts. Since however, only the positions and relative amplitudes of the multi-path components are required to determine the sync position, instead of the absolute amplitude, in preferred embodiments, each quadrature tap can be represented by only the sign of its respective I and Q components. For each tap, this saves, for this example, eighteen bits. Each sample of the received signal is also represented similarly. Therefore, both the dynamic range and bit widths of the arithmetic used in computing the filter output signal can be now significantly reduced as outlined below.

Instead of representing the I and Q components of the taps and excitation as ±1, these values are represented with logic 1 for +/−1 and logic 0 for −/+1. Then the filter equation becomes:

$$h_m(n) \cdot I = \sum_{i=0}^{N_g-1} 2 * \overline{XOR}(f_m(n-i) \cdot I, r(n-i) \cdot I) - 1 \qquad (7)$$

$$h_m(n) \cdot Q = \sum_{i=0}^{N_g-1} 2 * \overline{XOR}(f_m(n-i) \cdot Q, r(n-i) \cdot Q) - 1$$

where $\overline{XOR}(a,b)$. I is the real part and $h_m(n).Q$ is the imaginary part of the complex samples of said output signal, $f_m(n-i).I$ and $f_m(n-i).Q$ are the real and imaginary parts, respectively, of the impulse response of the matched filter represented as the positive or negative constants, $r(n-i).I$ and $r(n-i).Q$ are the real and imaginary parts, respectively, of the received signal samples represented as the positive or negative constant, Ng is the number of samples of the impulse response of the matched filter and the received samples, and n and i are indexes is the compliment of XOR(a, b). This avoids a requirement to calculate multiplication and, since the accumulator is only summing ±1, a more compact arrangement can be made, which can use a slower ripple adder.

Further savings in arithmetic and gates can be achieved by reducing the number of taps over which the filter equation is computed for each output. This can be achieved by either taking only a fraction of the taps e.g. only the middle $N_g/2$ taps or by decimation of the taps, for example, for a decimation by 4, the above equations become:

$$h_m(n) \cdot I = \sum_{i=0}^{N_g/4-1} 2 * \overline{XOR}(f_m(n-4i) \cdot I, r(n-4i) \cdot I) - 1 \qquad (8)$$

$$h_m(n) \cdot Q = \sum_{i=0}^{N_g/4-1} 2 * \overline{XOR}(f_m(n-4i) \cdot Q, r(n-4i) \cdot Q) - 1$$

The decimation factor affects the purity of the filter output. In practice therefore, different optimum decimation factors for each combination of mode and guard interval duration can be chosen.

As will be appreciated, a receiver having a matched filter implementation employing the simplified arrangement for calculating the convolution by logically combining the received signal samples and the filter impulse response may be used to detect a synchronisation position in any received signal having a predetermined characteristic. For the example embodiment described above, this predetermined characteristic is that the samples of the guard period are generated by copying data conveyed in another part of the received signal samples. However in other embodiments the predetermined characteristic may be any predetermined signal format, so that the impulse response of the filter is not limited to being adapted to the guard signal samples. For example, the filter may be matched to a known data sequence which may be either a pre-amble to the data to be detected or a mid-amble or a post-amble.

Various modifications may be made to the example embodiments herein before described without departing from the scope of the present invention. In particular, it will be appreciated that the synchronisation detector can be applied to any signal in which the guard interval is produced from repeating data bearing signal samples or repeating any other part of the transmitted signal.

The invention claimed is:

1. A receiver operable to detect a synchronisation position for recovering data from a set of received signal samples, said receiver comprising:

a filter having an impulse response matched to a predetermined characteristic of the received signal and operable to produce an output signal which is representative of the convolution of the impulse response and said received signal samples, a synchronisation detector operable to detect said synchronisation position from said filter output signal, and a data detector operable to detect and recover data from the set of received signal samples from the synchronisation position provided by said synchronisation detector, wherein each of said received signal samples is represented as a positive or negative constant in dependence upon the relative sign of the signal sample, and each of said samples of said filter impulse response is represented as a positive or negative constant in dependence upon the relative sign of said impulse response samples, and said filter is operable to convolve said impulse response with said received signal samples by logically combining the representation of said received signal samples and said impulse response to produce said output signal.

2. A receiver as claimed in claim 1, wherein said logical combining of said received signal samples and said impulse response is summing the XOR compliment of the combination of the representation of said received signal samples and said impulse response.

3. A receiver as claimed in claim 1, wherein said received signal samples are complex samples having real and imaginary components, said filter having a complex impulse response, wherein the synchronisation detector is operable to represent the real and imaginary components of each of the received signal samples as a positive or negative constant in dependence upon the relative sign of the real and imaginary components, and to represent the real and imaginary components of the samples of the filter impulse response as a positive or negative constant in dependence upon the relative sign of the real and imaginary components, said filter being operable to combine logically the complex samples of said impulse response with the complex received signal samples.

4. A receiver as claimed in claim 3, wherein said filter is operable to perform said logical combining of said impulse response with said received signal samples in accordance with the following equation:

$$h_m(n) \cdot I = \sum_{i=0}^{N_g-1} 2 * \overline{XOR}(f_m(n-i) \cdot I, r(n-i) \cdot I) - 1$$

$$h_m(n) \cdot Q = \sum_{i=0}^{N_g-1} 2 * \overline{XOR}(f_m(n-i) \cdot Q, r(n-i) \cdot Q) - 1$$

where $\overline{XOR}(a,b)$ is the complement of the logical XOR combination of a and b, $h_m(n).I$ is the real part and $h_m(n).Q$ is the imaginary part of the complex samples of said output signal, $f_m(n-i).I$ and $f_m(n-i).Q$ are the real and imaginary parts, respectively, of the impulse response of the matched filter represented as the positive or negative constants, $r(n-i).I$ and $r(n-i).Q$ are the real and imaginary parts, respectively, of the received signal samples represented as the positive or negative constant, Ng is the number of samples of the impulse response of the matched filter and the received samples, and n and i are indexes.

5. A receiver as claimed in claim 1, wherein said filter is operable to select a predetermined number of samples of said impulse response of said filter, and to perform the logical combining of said impulse response with said received signal samples only for the selected predetermined number of samples.

6. A receiver as claimed in claim 5, wherein said selected predetermined number of samples of said filter impulse response are evenly distributed over the temporal length of said impulse response.

7. A receiver as claimed in claim 6, wherein said predetermined number is an integer fraction 1/M of the total number of samples M of said impulse response.

8. A receiver as claimed in claim 6, wherein said logical combining is calculated in accordance with the following equation:

$$h_m(n) \cdot I = \sum_{i=0}^{N_g/4-1} 2 * \overline{XOR}(f_m(n-Mi) \cdot I, r(n-Mi) \cdot I) - 1$$

$$h_m(n) \cdot Q = \sum_{i=0}^{N_g/4-1} 2 * \overline{XOR}(f_m(n-Mi) \cdot Q, r(n-Mi) \cdot Q) - 1$$

where $\overline{XOR}(a,b)$ is the complement of the logical XOR combination of a and b, $h_m(n).I$ is the real part and $h_m(n).Q$ is the imaginary part of the complex samples of said output signal $f_m(n-i).I$ and $f_m(n-i).Q$ are the real and imaginary parts, respectively, of the impulse response of the matched filter represented as the positive or negative constants, $r(n-i).I$ and $r(n-i).Q$ are the real and imaginary parts, respectively, of the received signal samples represented as the positive or negative constant, Ng is the number of samples of the impulse response of the matched filter and the received samples, and n and i are indexes.

9. A receiver as claimed in claim 1, wherein said output signal has a plurality of temporally separated peaks, said synchronisation detector being operable to pre-process said output signal by identifying the temporal position of said peaks within said output signal which have an amplitude which is less than a pre-determined threshold, and setting the value of said output signal to a predetermined default value at said identified temporal positions, said sync position being determined from said pre-processed output signal.

10. A receiver as claimed in claim 9, wherein said default value is zero.

11. A receiver as claimed in claim 1, wherein said predetermined characteristic of said set of received signal samples is a sub-set of samples which are predetermined, said impulse response of said filter being matched to the signal samples corresponding to the data which is predetermined.

12. A receiver as claimed in claim 11, wherein said predetermined data is a data sequence known at the receiver.

13. A receiver as claimed in claim 11, wherein said predetermined data is a copied set of data from another part of said data bearing signal samples.

14. A receiver as claimed in claim 1, wherein said synchronisation detector is operable to pre-process said output signal by locating the relative temporal position of the maximum peak within said output signal, identifying for each other peak sample of said output signal another sample of said output signal at an opposite corresponding temporal displacement with respect to said relative temporal position of said maximum peak, and comparing said two samples and replacing the lower of the two samples with zero.

15. A receiver as claimed in claim 1, wherein said receiver is operable to process a plurality of said sets of received signal samples, said synchronisation detector being operable to combine said output signal from said synchronisation detector for each of a plurality of sets of received signal samples, and to estimate said synchronisation position from a peak value of said combined output signal.

16. A method of detecting a synchronisation position for recovering data from a set of received signal samples, said method comprising the steps of
representing each of said received signal samples as a positive or negative constant in dependence upon the relative sign of said received signal samples,
representing each sample of a filter impulse response matched to a predetermined characteristic of the received signal as a positive or negative constant in dependence upon the relative sign of said impulse response samples,
filtering said received signed samples with said impulse response by forming a representation of the convolution by logically combining the representation of said received signal samples and said impulse response to produce all output signal, and
detecting said synchronisation position from said output signal.

17. A method as claimed in claim 16, wherein said logical combining of said received signal samples and said impulse response comprises summing the XOR compliment of the combination of the representation of said received signal samples and said impulse response.

18. A method as claimed in claim 16, wherein said received signal samples are complex samples having real and imaginary components, said representing said received signal samples as a positive or negative constant comprises representing the real and imaginary components of each of the received signal samples as a positive or negative constant in dependence upon the relative sign of the real and imaginary components, and said representing said impulse response samples as a positive or negative constant comprises representing the real and imaginary components of the samples of the filter impulse response as a positive or negative constant in dependence upon the relative sign of the real and imaginary components, said logical combining being combining logically the complex samples of said impulse response with the complex received signal samples.

19. A method as claimed in claim 18, wherein said filtering comprises performing the convolution of said impulse response with said received signal samples in accordance with the following equation:

$$h_m(n) \cdot I = \sum_{i=0}^{N_g-1} 2 * \overline{XOR}(f_m(n-i) \cdot I, r(n-i) \cdot I) - 1$$

$$h_m(n) \cdot Q = \sum_{i=0}^{N_g-1} 2 * \overline{XOR}(f_m(n-i) \cdot Q, r(n-i) \cdot Q) - 1$$

where $\overline{XOR}(a,b)$ is the complement of the logical XOR combination of a and b, $h_m(n).I$ is the real part and $h_m(n).Q$ is the imaginary part of the complex samples of said output signal, $f_m(n-i).I$ and $f_m(n-i).Q$ are the real and imaginary parts, respectively, of the impulse response of the matched filter represented as the positive or negative constants, $r(n-i).I$ and $r(n-i).Q$ are the real and imaginary parts, respectively, of the received signal samples represented as the positive or negative constant, Ng is the number of samples of the impulse response of the matched filter and the received samples, and n and i are indexes.

20. A method as claimed in claim 17, wherein said filtering comprises
selecting a predetermined number of samples of said impulse response of said filter, and
performing the logical combining of said impulse response with said received signal samples only for the selected predetermined number of samples.

21. A method as claimed in claim 20, wherein said selected predetermined number of samples of said filter impulse response are evenly distributed over the temporal length of said impulse response.

22. A method as claimed in claim 21, wherein said predetermined number is an integer fraction 1/M of the total number of samples M of said impulse response.

23. A method as claimed in claim 20, wherein said logical combining is calculated in accordance with the following equation:

$$h_m(n) \cdot I = \sum_{i=0}^{N_g/4-1} 2 * \overline{XOR}(f_m(n-Mi) \cdot I, r(n-Mi) \cdot I) - 1$$

$$h_m(n) \cdot Q = \sum_{i=0}^{N_g/4-1} 2 * \overline{XOR}(f_m(n-Mi) \cdot Q, r(n-Mi) \cdot Q) - 1$$

where $\overline{XOR}(a,b)$ is the complement of the logical XOR combination of a and b, $h_m(n).I$ is the real part and $h_m(n).Q$ is the imaginary part of the complex samples of said output signal, $f_m(n-i).I$ and $f_m(n-i).Q$ are the real and imaginary parts, respectively, of the impulse response of the matched filter represented as the positive or negative constants, $r(n-i).I$ and $r(n-i).Q$ are the real and imaginary parts, respectively, of the received signal samples represented as the positive or negative constant, Ng is the number of samples of the impulse response of the matched filter and the received samples, and n and i are indexes.

24. A storage medium for storing a computer-controllable program for providing computer executable instructions, said computer-controllable program configures the computer to operate as a receiver as claimed in claim 1.

25. A storage medium for storing a computer-controllable program for providing computer executable instructions, said computer-controllable program causes the computer to perform the method according to claim 16.

26. A storage medium for storing a computer-controllable program for recording information signals which are representative of the computer program claimed in claim 24.

27. A storage medium for storing a computer-controllable program for recording information signals which are representative of the computer program claimed in claim 25.

* * * * *